under 35 U.S.C. 154(b) by 824 days.

(12) United States Patent
Li et al.

(10) Patent No.: US 10,093,756 B2
(45) Date of Patent: *Oct. 9, 2018

(54) PROCESS FOR CROSS-LINKED POLYETHYLENE PRODUCTION

(71) Applicant: FINA TECHNOLOGY, INC., Houston, TX (US)

(72) Inventors: Fengkui Li, Houston, TX (US); John Ashbaugh, Houston, TX (US); Jason Clark, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 824 days.

This patent is subject to a terminal disclaimer.

(21) Appl. No.: 14/484,966

(22) Filed: Sep. 12, 2014

(65) Prior Publication Data
US 2014/0378613 A1 Dec. 25, 2014

Related U.S. Application Data

(63) Continuation of application No. 13/401,539, filed on Feb. 21, 2012, now Pat. No. 8,883,921.

(51) Int. Cl.
C08F 8/46 (2006.01)
C08F 255/02 (2006.01)
C08F 8/32 (2006.01)
C08F 255/04 (2006.01)
C08F 255/06 (2006.01)
C08F 10/02 (2006.01)
C08F 8/00 (2006.01)

(52) U.S. Cl.
CPC ............ C08F 8/46 (2013.01); C08F 8/00 (2013.01); C08F 8/32 (2013.01); C08F 10/02 (2013.01); C08F 255/02 (2013.01); C08F 255/023 (2013.01); C08F 255/026 (2013.01); C08F 255/04 (2013.01); C08F 255/06 (2013.01); C08F 2810/20 (2013.01); Y10T 428/139 (2015.01)

(58) Field of Classification Search
CPC .. C08F 8/32; C08F 8/46; C08F 255/02; C08F 255/023; C08F 255/026; C08F 255/04; C08F 255/06; C08F 2810/20
See application file for complete search history.

(56) References Cited

U.S. PATENT DOCUMENTS

2006/0235156 A1* 10/2006 Griswold .............. C08F 287/00 525/192

* cited by examiner

Primary Examiner — Ling Choi
Assistant Examiner — David L Miller
(74) Attorney, Agent, or Firm — Albert Shung

(57) ABSTRACT

A method of producing a silane cross-linked polyethylene is disclosed which includes maleating a polyethylene polymer to form a maleated polyethylene and reacting the maleated polyethylene with a primary or secondary amino silane to form a silane-grafted polyethylene. The method further includes treating the silane-grafted polyethylene in a moisture curing process to form the silane cross-linked polyethylene.

18 Claims, 1 Drawing Sheet

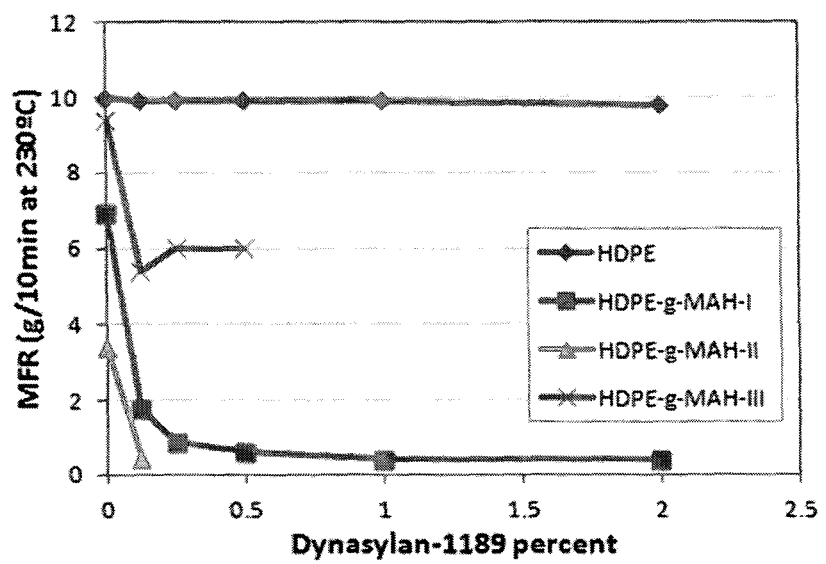

PROCESS FOR CROSS-LINKED POLYETHYLENE PRODUCTION

CROSS-REFERENCE TO RELATED APPLICATIONS

This application is a Continuation of U.S. application Ser. No. 13/401,539, filed on Feb. 21, 2012.

FIELD

Embodiments of the present disclosure generally relate to the production of cross-linked polyethylene.

BACKGROUND

Silanes are commonly employed as cross-linkers for the production of PEX-b articles (silane cross-linked polyethylene) such as pipe, wire coatings, insulation jacketing for voltage cables, insulation foams, and heat shrinkable products. The silane is typically used in conjunction with a peroxide, which facilitates grafting of the silane onto the cross-linking polymer.

Traditional PEX-b production technologies include the two-step "Sioplas" process and the single-step "Monosil" process. The two methods each graft vinylsilane, such as vinyltrimethoxy silane, onto polyethylene and then moisture cross-link silane groups into three dimensional cross-linked polyethylene. The grafting reaction is typically performed in a single screw extruder, while the hydrolysis/condensation reaction can be done under a variety of conditions, including exposure to moisture under ambient conditions, exposure to hot water via submersion of the grafted resin, or exposure to steam. In the production of potable water pipes, for example, hot water may be circulated through the extruded pipe to complete the crosslinking.

Often, when silane is grafted onto polyethylene chains, the side chains can contain multiple silanes due to homopolymerization of vinylsilane. Theoretically, one silane group per graft chain would be sufficient for cross-linking, i.e., the use of expensive silane monomers may not be efficient with typical current methods. In addition, during moisture cross-linking, each of the silanes in the same side chain can participate in cross-linking. Thus, cross-links may not be evenly distributed all across the polyethylene materials. This reaction is shown below:

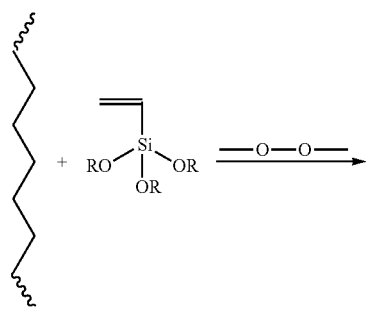

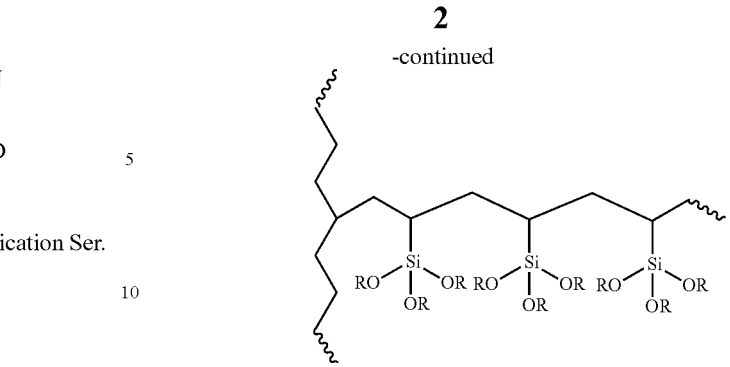

In view of the above, it would be desirable to more efficiently use silane monomers and more evenly distribute the cross-linking in PEX-b materials, thereby increasing long-term performance of PEX-b articles.

SUMMARY

Embodiments of the present disclosure include a method of producing cross-linked polyethylene and cross-linked polyethylene articles using maleic anhydride and a silane.

In one embodiment of the present disclosure, a method of producing a cross-linked polyethylene is disclosed. The method includes maleating a polyethylene polymer to form a maleated polyethylene and reacting the maleated polyethylene with a primary or secondary amino silane to form a silane-grafted polyethylene. The silane-grafted polyethylene is then treated in a moisture curing process to form the cross-linked polyethylene.

BRIEF DESCRIPTION OF THE DRAWINGS

FIG. 1 is a graph illustrating melt flow rates as measured by ASTM D1238 at 230° C. of extrusion products of maleated HDPE at various levels of amino-silane.

DETAILED DESCRIPTION

A detailed description will now be provided. Each of the appended claims defines a separate invention, which for infringement purposes is recognized as including equivalents to the various elements or limitations specified in the claims.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

In certain embodiments of the present disclosure, maleic anhydride is grafted onto polyethylene main chains. In these embodiments, a maleated polyethylene is manufactured by mixing in the melt phase a polyethylene homopolymer or copolymer, maleic anhydride and a free radical initiator.

The maleated polyethylene may be manufactured in batches or in a continuous process. In examples of continuous process, the reactants; polyethylene, maleic anhydride, and a free radical initiator are continuously introduced into the molten mixture and maleated polyethylene product is continuously removed. One method of continuously maleating polyethylene is in the melt phase in a screw extruder, and in some embodiments, a twin screw extruder. When the continuous process is a screw extruder, the free radical initiator is typically added by an injection port to the molten polyethylene and maleic anhydride mixture. In another embodiment, the method of continuously maleating polyethylene is in a continuous stirred reactor.

The amount of maleic anhydride used in certain embodiments of the present invention is at least 0.35 weight percent, in other embodiments at least 1.8 weight percent, and in still other embodiments at least 3 weight percent. In other embodiments of the present disclosure, the maleic anhydride used in the process is from about 4 to about 7 weight percent. Amounts of maleic anhydride much below 0.35 weight percent typically do not significantly maleate the polyethylene to a useful acid number, whereas amounts of maleic anhydride significantly higher than 7 percent may require additional equipment to remove unreacted maleic anhydride from the product.

The free radical initiator used in certain embodiments of the present disclosure is a peroxide. Suitable examples of peroxide include di-t-butylperoxide, di-(t-butylperoxyisopropyl)benzene, 2,5-dimethyl-2,5-di-(t-butylperoxy)-3-hexene, benzoyl peroxide, and 2,5-dimethyl-2,5-di(t-butylperoxy)hexane.

The amount of peroxide used in the process in certain embodiments is at least 0.05 weight percent, in certain other embodiments at least 0.3 weight percent and in still other embodiments at least 0.5 weight percent. In other embodiments, the weight percent of peroxide is about 0.6 to about 0.8 weight percent. Peroxide concentrations of much less than 0.05 weight percent typically does not react with the maleic anhydride and polyethylene to maleate the polyethylene to a sufficient extent. Peroxide concentrations significantly above 0.8 weight percent typically does not significantly increase the maleation of polyethylene.

The amount of maleic anhydride to free radical initiator is in molar excess and the molar ratio of maleic anhydride to free radical initiator in certain embodiment is about 2 to 50, in other embodiments about 5 to 40, and in still other embodiments 10 to 19. Amounts of maleic anhydride much below the molar ratio of 2 are less useful and waste the excess free radical initiator and can cause crosslinking. Amounts of maleic anhydride in the molar ratio much above 50 are in excess of maleic anhydride and cannot be reacted with the free radical initiator and the polyethylene to maleate the polyethylene.

As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. % or at least about 90 wt. % polyethylene relative to the total weight of polymer, for example. The polyethylene of this invention can be a homopolymer or copolymer. The polymers (and blends thereof) formed via the processes described herein may include, but are not limited to, linear low density polyethylene, low density polyethylene, medium density polyethylenes, and high density polyethylenes. In certain embodiments, the ethylene polymer is a copolymer with an ethylene content of from about 90 to about 100 mol %, with the balance being made up of $C_3$-$C_{10}$ alpha olefins.

The ethylene based polymers may have a density (as measured by ASTM D-792) of from about 0.80 g/cc to about 0.98 g/cc, or from about 0.88 g/cc to about 0.965 g/cc, or from about 0.90 g/cc to about 0.965 g/cc, for example.

The ethylene based polymers may have a melt index ($MI_2$) (as measured by ASTM D-1238) of from about 0.01 dg/min to about 100 dg/min., or from about 0.01 dg/min. to about 25 dg/min., or from about 0.03 dg/min. to about 15 dg/min. or from about 0.05 dg/min. to about 10 dg/min, for example.

In certain embodiments, the maleating of the polyethylene is conducted in the melt phase at a temperature of below 220° C. In other embodiments, the maleating of the polyethylene is performed between about 130° C. to 190° C. and in other embodiments, between about 160° C. to 190° C. At temperatures significantly below 110° C., typically the reaction is significantly slowed and stirring or pumping is difficult, whereas at temperatures much above 220° C. the polyethylene may begin to crosslink by way of a new reaction mechanism.

Volatiles generally are removed from the maleated polyethylene. These volatiles are typically unreacted maleic anhydride. Volatiles may be removed by passing an inert gas stream such as nitrogen over and/or through the maleated polyethylene mixture exiting the process, such as by bubbling nitrogen through the maleated polyethylene mixture.

Maleic anhydride monomers are typically difficult to homopolymerize. Therefore the maleated polyethylene typically contains side chains consisting of one between one and three maleic anhydride molecules.

Following the maleation step, the maleated anhydride polymer is then melt blended with primary-amino silanes such as 3-aminopropyltriethoxysilane or secondary amino silanes, such as N-(n-butyl)-3-amino-propyltrimethoxysilane (collectively "amino silanes"). When maleated polyethylene is melt blended with the primary-amino salines or secondary-amino silanes, the silane monomer may react with maleic anhydride side chain, forming silane-grafted polyethylene, as shown below:

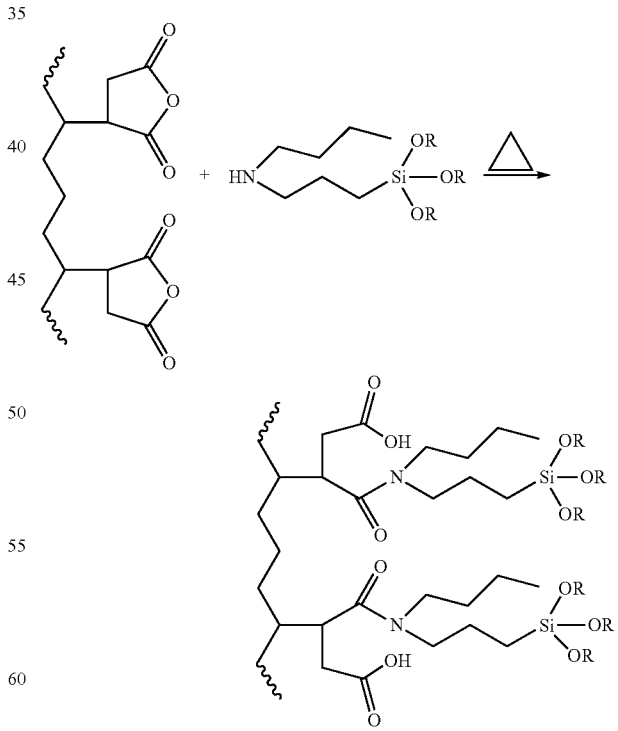

Compared to traditional methods of making PEX-b, it is easier to produce maleated polyethylene with more side chains with the methods presented in the current disclosure. Further, generally, use of the current disclosure results in maleated polyethylene where each side chain has only one or two maleic anhydride groups. The molar ratio of silane monomer and maleic anhydride on polypropylene is often about 1:1, and can range from about 2:1 to about 1:2. In other embodiments, the molar ratio is 1.5:1 to 1:1.5.

Melt blending of the amino silane with the maleated polyethylene may be performed by traditional means, such as with a screw extruder, and in some embodiments, a twin screw extruder. Generally, temperatures during melt extruding of the silane and maleated polyethylene are between 180° C. and 250° C.

Melt blending of the amino silane with the maleated polyethylene results in a silane grafted-polyethylene. Because the maleated polyethylene has more side chains with typically only one or two maleic anhydride groups, after melt blending with the amino-silane, the silane-grafted polyethylene has multiple side chains and each side chain typically has only one or two silane groups.

Following melt blending to form the silane-grafted polymer, the silane grafted polymer undergoes a moisture crosslinking or moisture curing process to form the silane crosslinked polyethylene. In the moisture curing process, the silane-grafted polymer is subjected to a water bath or steam sauna to complete the crosslinking process. The reaction to crosslink the polyethylene polymers is fast, but diffusion of water into the silane-grafted polymer may be a limiting factor. In certain embodiments, a hot water bath or low pressure steam autoclave are used to speed the cross-linking process. In certain embodiments, a silane crosslinking catalyst is also added. Such catalysts include carboxylates of metals, such as tin, zinc, iron, lead and cobalt; organic bases; inorganic acids; and organic acids. Such catalysts include dibutyl tin dilaurate (DBTDL), dibutyl tin diacetate, dioctyl tin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as toluene sulphonic acid, acetic acid, and stearic acid. One of ordinary skill in the art with the benefit of this disclosure will recognize that this list is non-limiting and any suitable silane crosslinking catalyst may be used.

Unexpectedly, the process of the current disclosure, in particular the addition of the maleating step to form the maleated polyethylene, results in a much more efficient use of silane monomers compared to conventional methods for manufacture of PEX-b. Further, upon moisture crosslinking, the distribution of crosslinks is more homogeneous than conventional methods, resulting in desirably superior long-term pipe performances.

The resulting silane cross-linked polyethylene may be used to form such articles as pipe, wire coatings, insulation jacketing for voltage cables, insulation foams, and heat shrinkable products, for example.

EXAMPLES

Example 1 describes a process for making maleated polyethylene:

Petrochemicals HDPE BDM09-30, lot D00510645 (MI2=5.0 g/10 min) was used for making maleated HDPE via reactive extrusion with maleic anhydride and peroxides on a 27 mm twin screw extruder. Sample #1 is neat re-extruded HDPE. Sample #2 is a maleated HDPE based on 2% maleic anhydride and 100 ppm Luperox 101 supplied by Arkema Inc. (a dialkyl peroxide). Sample #3 is a maleated HDPE based on 2% maleic anhydride and 250 ppm Luperox 101. Sample #4 is a maleated HDPE based on 2% maleic anhydride and 500 ppm Perkadox-24L supplied by Akzo Nobel Polymer Chemicals (Dicetyl peroxydicarbonate). The melt flow rates, measured using ASTM D1258 at 230° C., of the products are listed in Table 1. As expected, when Luperox-101 was used, HDPE melt index is lowered due to concurrent branching reactions by peroxide. However, unexpectedly, when Perkadox-24L is used, the melt index of the product is similar to that of the neat HDPE base resin.

TABLE 1

| Maleated PP resins | | | | |
|---|---|---|---|---|
| # Samples | BDM09-30 | MAH | Peroxide | MFR |
| 1 HDPE | 100 | 0 | 0 | 10.3 |
| 2 HDPE-g-MAH-I | 98 | 2% | 100 ppm L-101 | 7.7 |
| 3 HDPE-g-MAH-II | 98 | 2% | 250 ppm L-101 | 3.3 |
| 4 HDPE-g-MAH-III | 98 | 2% | 500 ppm Perkadox-24L | 10 |

Example 2 describes a process of making crosslinked HDPE

The samples #1 through #4 were melt blended with different levels of Dynasylan 1189, i.e. N-(n-butyl)-3-amino-propyltrimethoxysilane, a secondary amine silane supplied by Evonik. FIG. 1 shows that the melt flow rates of the materials decreased significantly upon addition of Dynasylan 1189, indicating that grafting of silane onto polyethylene occurred almost concurrently with crosslinking of silane groups probably due to presence of small amounts of water. When same amounts of Dynasylan AMEO, i.e. 3-aminopropyltriethoxysilane, a primary amine silane also supplied by Evonik, was used, the melt flow rate drop was even more significant, indicating more fast reactions with primary amine in the system. The results confirmed that crosslinked polyethylene were formable by the reactive extrusion of maleated polyethylene and amino-silane by a different route from the conventional PEX-b technology.

While the foregoing is directed to embodiments of the present invention, other and further embodiments of the invention may be devised without departing from the basic scope thereof and the scope thereof is determined by the claims that follow.

What is claimed:

1. A method comprising:
   maleating a polyethylene polymer to form a maleated polyethylene, wherein maleating the polyethylene polymer comprises combining the polyethylene polymer, a free radical initiator, and maleic anhydride to form a reaction mixture, wherein the maleic anhydride concentration is at least 1.8 weight percent of the reaction mixture;
   reacting the maleated polyethylene with a primary or secondary amino silane to form a silane-grafted polyethylene; and
   treating the silane-grafted polyethylene in a moisture curing process to form the silane cross-linked polyethylene.

2. The method of claim 1, wherein the maleic anhydride concentration is up to about 7 weight percent of the reaction mixture.

3. The method of claim 1, wherein the maleic anhydride concentration is at least 3 weight percent of the reaction mixture.

4. The method of claim 3, wherein the maleic anhydride concentration is up to about 7 weight percent of the reaction mixture.

5. The method of claim 1, wherein the primary or secondary amino silane is 3-aminopropyltriethoxysilane.

6. The method of claim 1, wherein the primary or secondary amino silane is N-(n-butyl)-3-amino-propyltrimethoxysilane.

7. The method of claim 1, wherein the step of maleating the polyethylene polymer is performed in a screw extruder or a continuously stirred reactor.

8. The method of claim 1, wherein the free radical initiator is selected from the group consisting of di-t-butylperoxide, di-(t-butylperoxyisopropyl)benzene, 2,5-dimethyl-2,5-di-(t-butylperoxy)-3-hexene, benzoyl peroxide, and 2,5-dimethyl-2,5-di(t-butylperoxy)hexane.

9. The method of claim 1, wherein the free radical initiator is a peroxide, and wherein the peroxide concentration is at least 0.5 wt % of the reaction mixture.

10. The method of claim 9, wherein the peroxide concentration is from about 0.6 to 0.8 wt % of the reaction mixture.

11. The method of claim 1, wherein the polyethylene polymer is a homopolymer, or wherein the polyethylene polymer includes a $C_3$-$C_{10}$ alpha olefin.

12. The method of claim 1, wherein the step of maleating the polyethylene polymer is performed at a temperature of from about 130° C. to about 190° C.

13. The method of claim 1, further comprising after maleating the polyethylene polymer:
    passing an inert gas over or through the maleated polyethylene.

14. The method of claim 1, wherein the step of reacting the maleated polyethylene with a primary or secondary amino silane is performed at between 180° C. and 250° C.

15. The method of claim 1, wherein the moisture curing process is performed by subjecting the silane-grafted polyethylene to a water bath or a steam sauna.

16. The method of claim 1, further comprising adding a silane crosslinking catalyst.

17. The method of claim 16, wherein the silane crosslinking catalyst is a metal carboxylate, an organic base, an inorganic acid, or an organic acid.

18. The method of claim 16, wherein the silane crosslinking catalyst is dibutyl tin dilaurate, dibutyl tin diacetate, dioctyl tin dilaurate, stannous acetate, stannous caprylate, lead naphthenate, zinc caprylate, cobalt naphthenate, ethyl amines, dibutyl amine, hexylamines, pyridine, sulphuric acid, hydrochloric acid, toluene sulphonic acid, acetic acid, or stearic acid.

* * * * *